United States Patent [19]

Hamilton et al.

[11] Patent Number: 4,651,838
[45] Date of Patent: Mar. 24, 1987

[54] AIR SPRING CONTROL SYSTEM AND METHOD

[76] Inventors: James M. Hamilton, 1167 Loma Portal Dr., El Cajon, Calif. 92020; Lonnie K. Woods, 2222 Lindsay Michelle, Alpine, Calif. 92001; Michael W. Godwin, 7066 Rock Manor Dr., San Diego, Calif. 92119

[21] Appl. No.: 661,196

[22] Filed: Oct. 15, 1984

[51] Int. Cl.⁴ .................... G01G 5/04; G01G 19/10
[52] U.S. Cl. ................................. 177/209; 177/141; 73/862.58; 280/DIG. 1
[58] Field of Search ............... 177/141, 208, 209, 254; 73/862.58; 280/707, 74, DIG. 1

[56] References Cited

U.S. PATENT DOCUMENTS

| | | | |
|---|---|---|---|
| 601,339 | 3/1898 | Freeman | 280/124 |
| 3,331,458 | 7/1967 | Van Raden et al. | 177/141 |
| 3,420,325 | 1/1969 | McAlister et al. | |
| 3,574,352 | 4/1971 | Elliott | |
| 3,581,836 | 6/1971 | Segerdahl et al. | 73/862.58 |
| 3,666,286 | 5/1972 | Engfer | 280/DIG. 1 |
| 4,062,415 | 12/1977 | Miller | 177/208 |
| 4,164,664 | 8/1979 | Kasiewicz | 280/DIG. 1 |
| 4,354,693 | 10/1982 | Maeda et al. | 280/714 |
| 4,456,084 | 6/1984 | Miller | 177/254 X |
| 4,474,063 | 10/1984 | Krueger | 73/862.58 |

Primary Examiner—E. A. Goldberg
Assistant Examiner—Patrick W. Foster
Attorney, Agent, or Firm—Christie, Parker & Hale

[57] ABSTRACT

A method and system are set forth for determining the force necessary to separate a first and a second mass by using an inflatable member such as an air spring. More specifically, the invention includes a system and method for load leveling of a vehicle. The system and method includes means for determining the weight on each spring by inflating the spring at a substantially constant rate. The pressure of the gas within the air spring is sensed at time intervals and, through a microprocessor or the like, the sensed pressure at the time intervals is assembled into a pressure-time history. From the pressure time history, the pressure is determined at which the chassis begins to lift. The determined pressure is processed to give an indication of the weight of the chassis borne by the air spring. The foregoing procedure is repeated for each air spring so that a gross vehicle weight can be determined as well as the distribution of weight upon each air spring. Once weight borne by each spring is known, the control can supply the correct pressure to the air spring to support such weight at the desird height.

10 Claims, 14 Drawing Figures

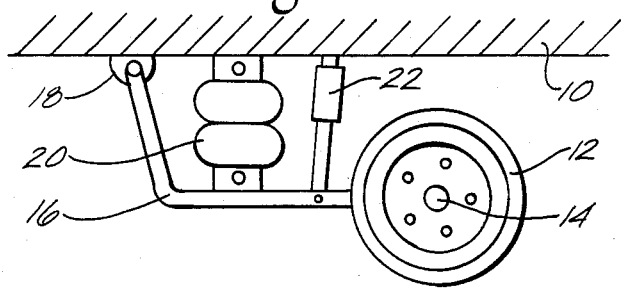
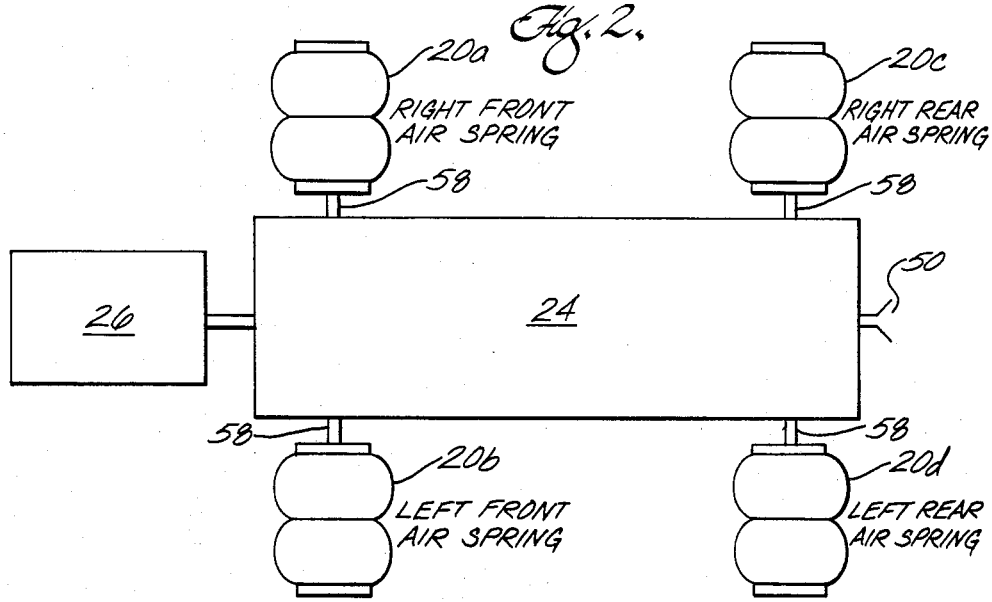
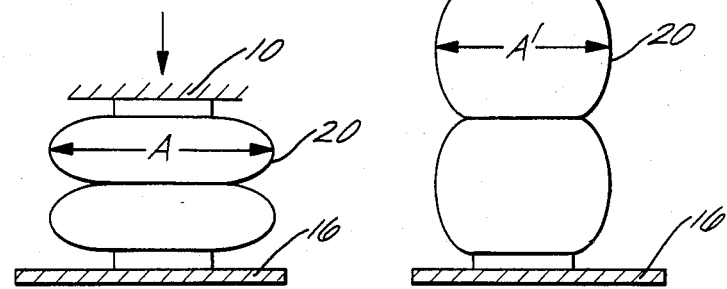

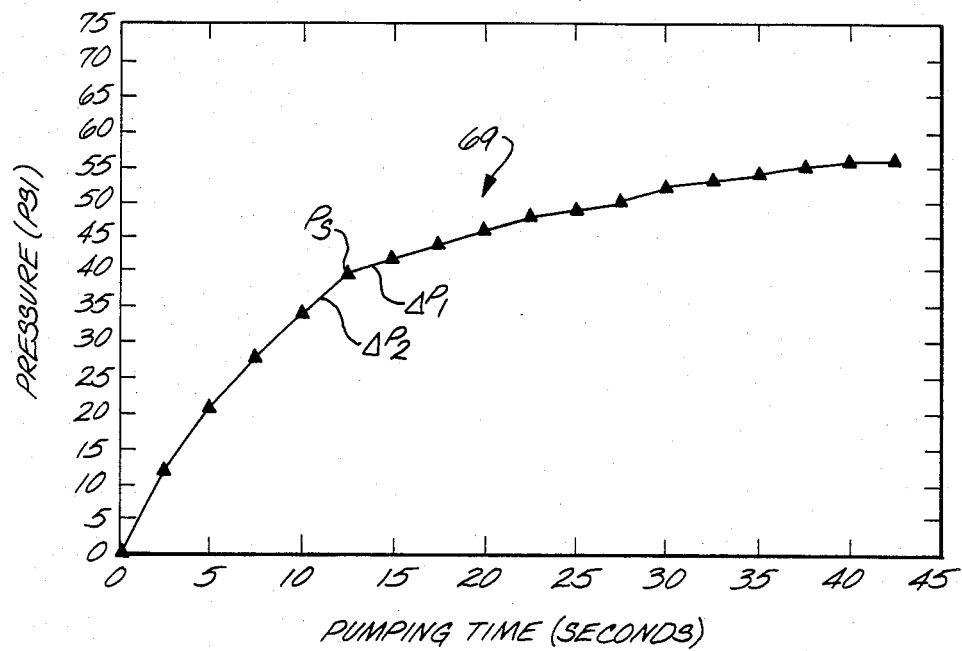
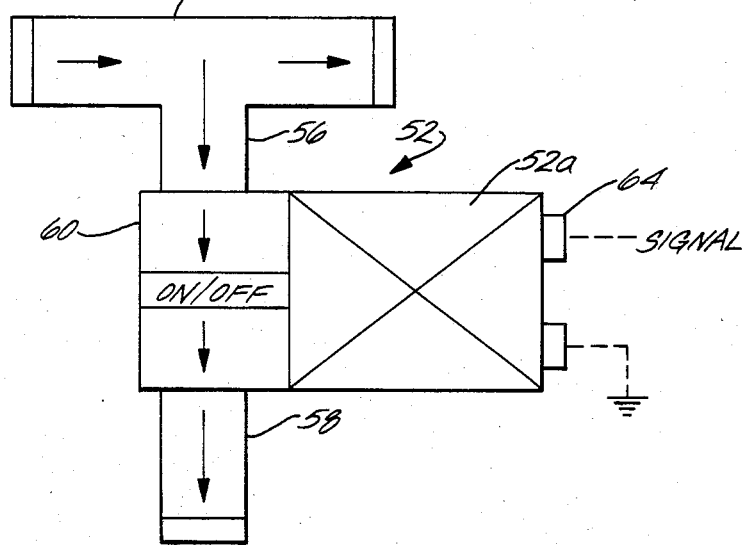

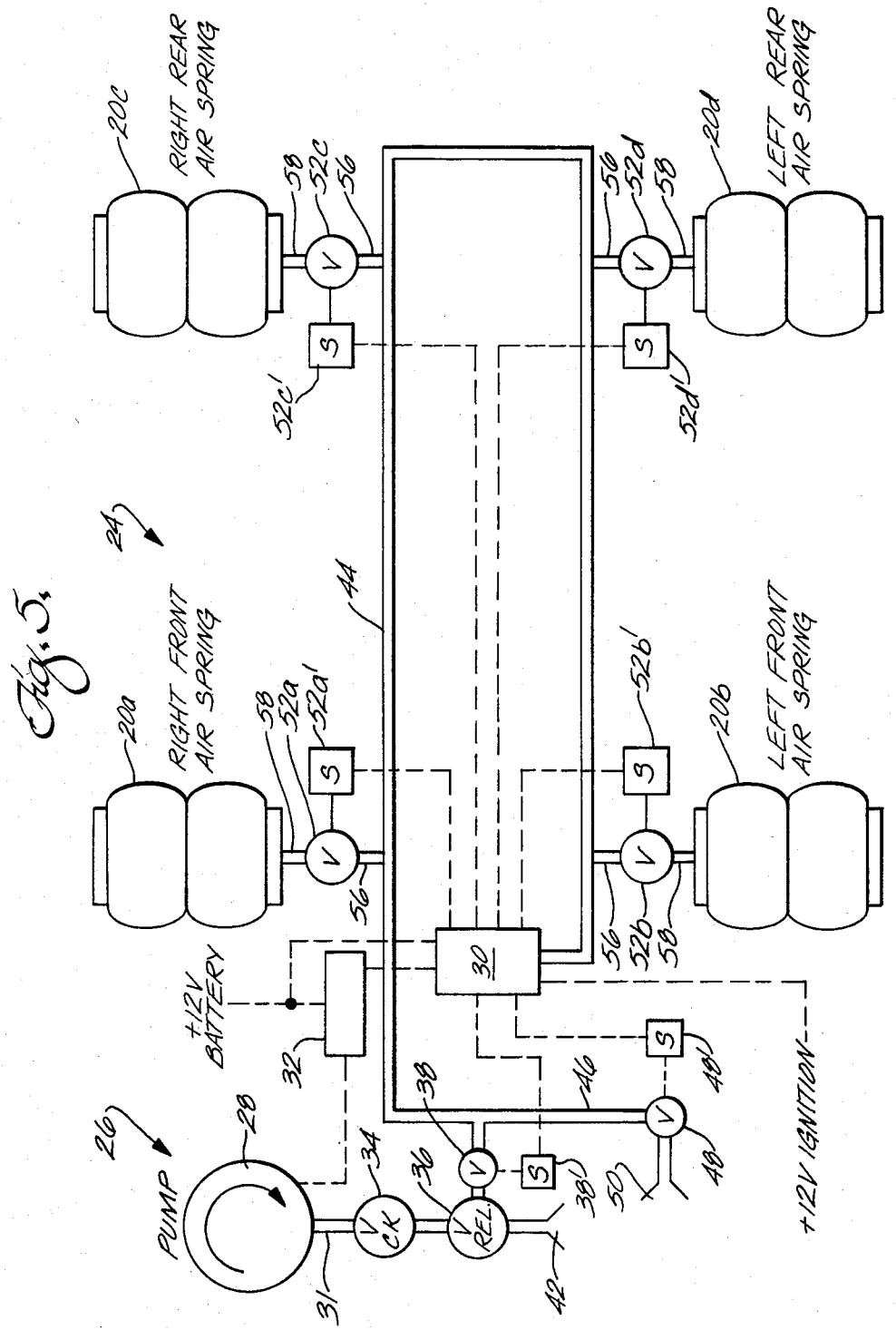

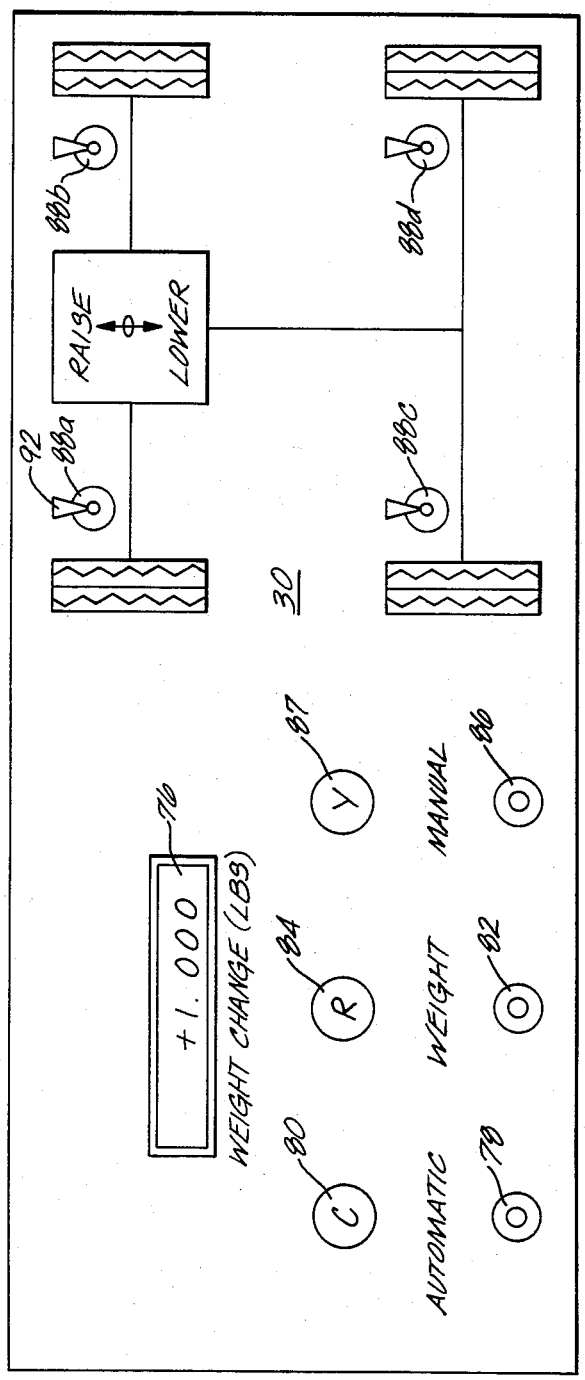

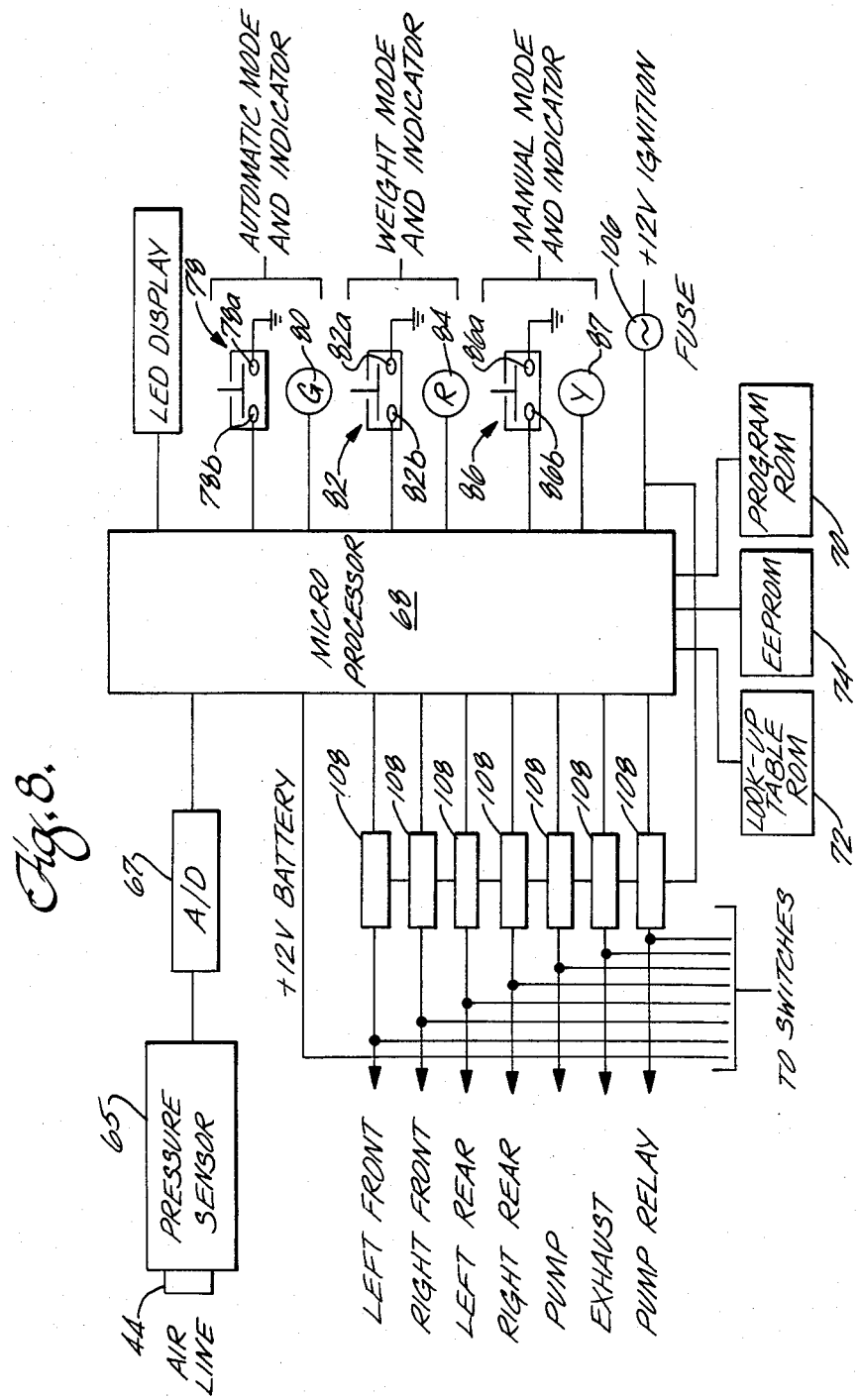

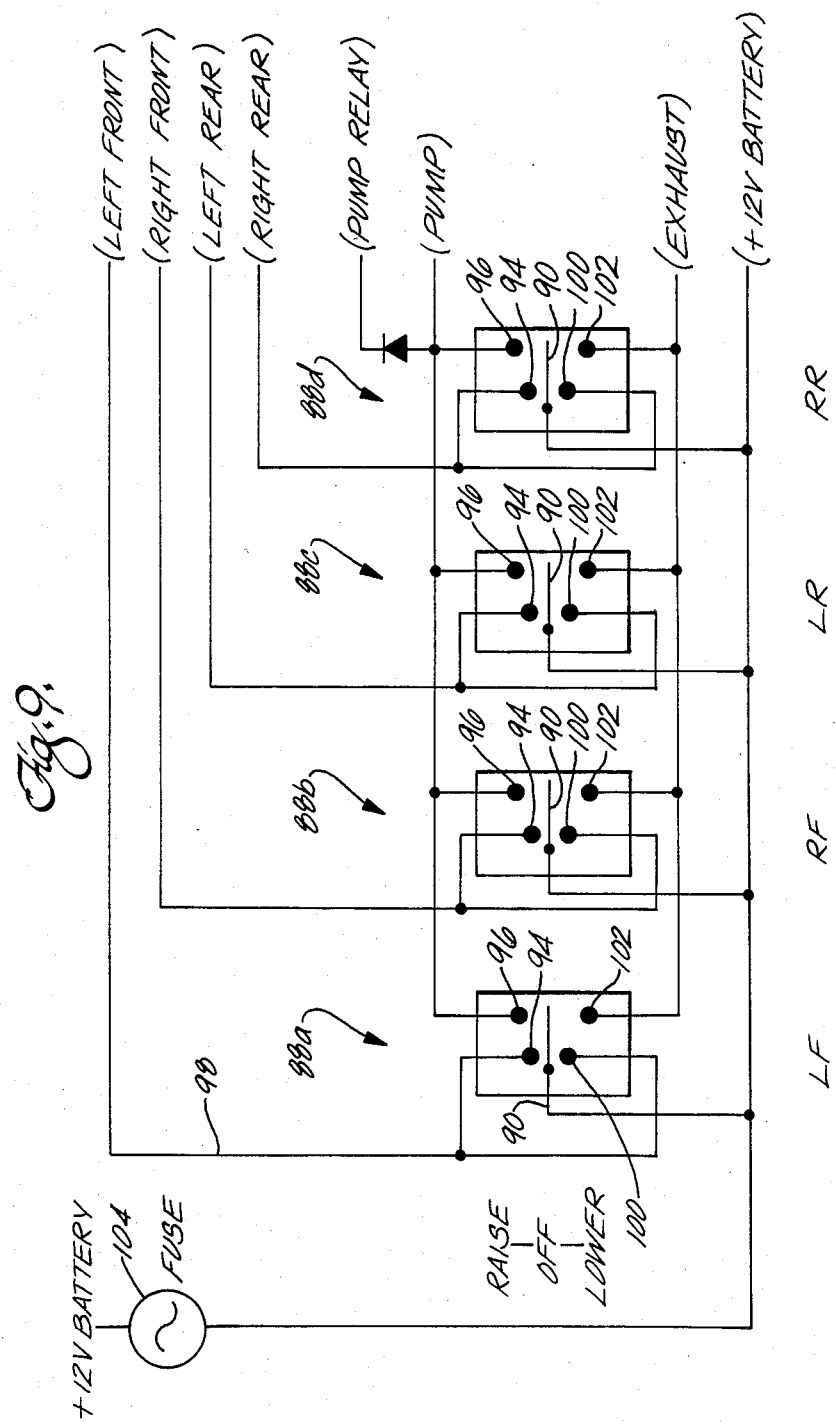

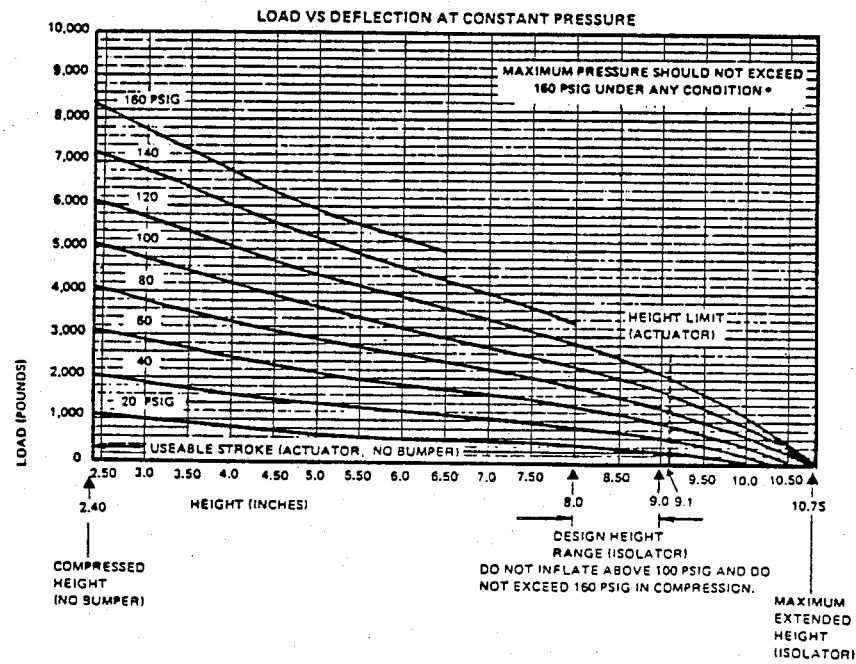
Fig. 12 TABLE I
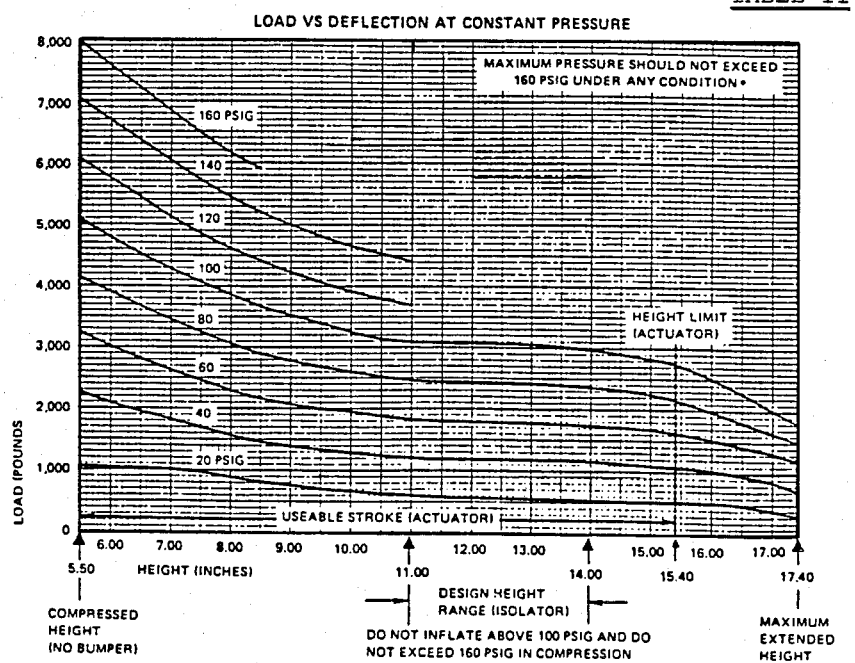
Fig. 13 AIR ACTUATORS/AIR ISOLATORS TABLE II

AIR SPRING CONTROL SYSTEM AND METHOD

FIELD OF THE INVENTION

This invention relates to air spring control systems and more particularly to air spring load leveling systems and methods for vehicles.

BACKGROUND OF THE INVENTION

Air springs have been used for some time to level or to raise vehicles for whatever desired purpose, such as when the cargo changes or for off-road travel. These air springs are disposed between the wheel's axle or axle support (the unsprung mass) and the chassis (the sprung mass). When deflated, the chassis is lowered to rest upon the axle or support, the chassis being supported by, for example, rubber stops or the like. When inflated, the chassis is raised relative to the axle or support to the desired height. Shock absorbers are also typically provided between the chassis and the wheel axles or supports to dampen relative motion between the chassis and axles.

To raise the chassis, the air spring or springs are inflated, usually manually or, recently, by suitable controls. The pressure of the compressed air within the spring rises resulting in a corresponding lifting of the chassis by the air springs.

If the cargo or passengers are not evenly loaded on the chassis, the pressure of one or several of the air springs must be adjusted to maintain the chassis level. Accordingly, sensors such as position transducers or proximity switches must be provided at some or all of the air springs if automatic control is to be achieved. The location of the sensors and the appropriate connecting wires from the sensors to the control have caused concern from a cost and reliability standpoint in that the switches are subject to corrosion, road grime or the like. For manual control, each air spring must be adjusted whenever the loading of the chassis changes. Adjustment of the springs as loading of the chassis is altered is time consuming, requires an outside source of compressed air and is laborious.

SUMMARY OF THE INVENTION

There is, therefore, provided in the broad aspects of the present invention a method and system for determining the force necessary to separate a first and a second mass by using an inflatable member such as an air spring. More specifically, the invention includes a system and method for load leveling of a vehicle which does not require position sensors at each wheel, which can determine the weight imposed upon each inflatable member and its distribution on the vehicle chassis and which can quickly and easily level the vehicle at any selected height.

Toward this end the method, in its broad aspects, for determining the force necessary to separate a first and second mass, employs an inflatable member disposed between the masses. The method includes inflating the member with a compressed gas at a substantially constant flow rate and sensing the pressure of the gas within the member during inflation. Preferably, the pressure sensing takes place at substantially even time intervals. From the sensed pressure, the method further includes generating a pressure-time history for the inflation of the member. From the pressure-time history, the method determines when the differential pressure between time intervals decreases which is indicative of the beginning of the separation of the masses. When such a point is determined, the method includes issuing a pressure signal and processing the signal with the known characteristics of the inflatable member to determine the force necessary to separate the masses. The method takes advantage of the characteristics of the inflatable member which are a relatively constant volume when deflated (i.e., before the masses begin to separate) and the fact that the volume of the member increases when the masses separate. Accordingly, the change of volume affects the pressure-time history indicating that the masses have begun to separate.

More specifically, the invention is directed toward a load leveling system and method for a vehicle having an inflatable air spring at each of the axles or axle supports. The air springs are preferably of the bellows-type, but the vehicle suspension system may include rolling lobe type air springs at the rear axles. The bellows-type springs have a characteristic such that the cross section of the spring against which the pressurized gas acts to lift the chassis decreases as the spring lengthens and lifts the chassis. Accordingly, once the cross-sectional area is known as determined from the spring length and if pressure is also known the force, i.e., weight, of the chassis on the spring can also be determined.

To take advantage of this characteristic of the bellows-type spring for load leveling, the control system includes means for determining the weight on each spring. To determine the weight, a reference length of the spring must be determined. According to one method, the reference length of the spring is when the spring is deflated and the chassis rests upon the axle or axle supports. In this position, the length of the spring is constant determined by the manner in which the spring is secured between the chassis and axle or axle supports.

To determine the weight, the spring is inflated from a source of compressed gas, such as air, at a substantially constant rate. The system includes means for sensing the pressure of the gas within the air spring at time intervals which preferably are evenly spaced in time. Through a microprocessor or the like, the sensed pressure at the time intervals is assembled into a pressure-time history. In that the volume of the spring is relatively constant until the chassis lifts and becomes supported on the spring, the pressure-time history until such an event is approximately linear having a slope determined by the pressure of the air and the spacing of the time intervals. In other words, the differential pressure between the pressure sensed at one-time interval and that sensed at the next preceding time interval is substantially constant when compared with the differential pressure sensed between the next preceding time interval and the second preceding time interval or the average differential pressure determined for the preceding time intervals on the pressure-time history. When the slope of the pressure-time history, i.e., the differential pressure between the sensed pressure at the instant time interval and the next preceding time interval decreases relative to the slope of the pressure-time history between the next preceding time interval and the second preceding time interval, the sensed pressure of the next preceding time interval represents the pressure at which the chassis begins to lift and to be supported on the spring. Since the pressure is known, and the cross-sectional area of the deflated spring is known, the pressure signal is processed to give an indication of the weight of the chassis borne by the air spring. The foregoing procedure is repeated for each air spring so that a gross vehicle weight can be determined as well as the distribution of weight upon each air spring. If the characteristics of the vehicle are known, the distribution of weight can be used to calculate the center of gravity of the vehicle.

An alternative method to calculate the weight of the vehicle is to provide a position sensor to provide input as to the height, i.e., length of the spring. With such position sensors, it is not necessary to deflate the springs and transfer the load to the axle or axle support. By inflating the air spring until the position sensor is triggered, and sensing the pressure at such point, the weight of the vehicle borne by that spring can be determined.

Once the weight borne by each spring is known as determined from the calibration cycle discussed above, the control can supply the correct pressure to the air spring to support such weight at the desired height. In this manner, the vehicle can be leveled regardless of the weight distribution on the vehicle. The invention also includes manual overrides of the control system for leveling the vehicle, for example, when it is parked on an incline.

As can be appreciated, the foregoing control system and methods can provide for the weighing, leveling and determination of weight distribution without requiring position sensors. If position sensors are provided, the weighing and load distribution can easily be determined.

The aforementioned control system may be employed on only the front or the back of a vehicle Also the aforementioned control system may be employed on either the front or the back of the vehicle and position sensors on the air springs at the other end of the vehicle.

BRIEF DESCRIPTION OF THE DRAWINGS

These and other features and advantages of the present invention will become appreciated as the same become better understood with reference to the specification drawings and claims wherein:

FIG. 1 is a schematic view of a suspension system for one wheel of a vehicle;

FIG. 2 is a schematic view of the air springs for all four wheels of a vehicle and the control system therefor;

FIGS. 3A and 3B illustrate the change in cross sectional area of a typical bellows-type spring;

FIG. 4 shows a time-pressure history for a typical bellows-type spring during inflation and which indicates the transfer of a load to the spring;

FIG. 5 is a schematic view of the control system for the air springs;

FIG. 6 shows a typical air solenoid used for each air spring of FIG. 5;

FIG. 7 illustrates an exemplary control panel for the air spring control system adapted to be disposed at the vehicle dash;

FIG. 8 diagramatically illustrates a data processing device and its various inputs and outputs providing the control function for the system;

FIG. 9 is an electrical schematic for the dash board switches of the control panel of FIG. 7;

FIG. 12 is a table showing load versus deflection at constant pressure for a bellows-type air spring; and FIG. 13 is a table showing load versus deflection at constant pressure for a rolling-lobe type air spring.

DETAILED DESCRIPTION

Figure 10:
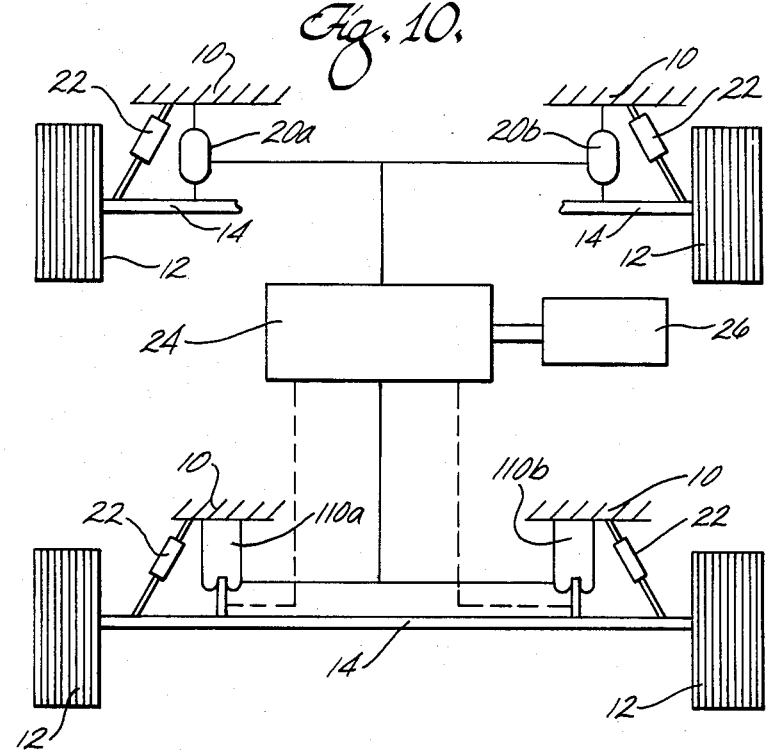
FIG. 10 is a schematic showing the use of bellows-type air springs for the front wheels and rolling lobe type air springs for the rear wheels.

Turning to the drawings, FIG. 1 schematically shows a use for the system and method according to the present invention. While the invention hereinafter described will be set in the context of vehicular suspension systems, it is to be understood that the invention has a wide range of non-vehicular applications including leveling, weighing and load distribution determination or the like, or any combination of these applications as desired.

In FIG. 1 a pair of masses are shown represented by a sprung mass which may be a vehicle chassis 10 and an unsprung mass shown as wheel 12. The wheel 12 is mounted to an axle 14 supported relative to the chassis 10 by an axle support represented by a mounting arm 16. The arm is pivotally connected at a connection 18 to the chassis 10. It is to be understood that all of the axles of the vehicle are supported by suitable means for relative movement between the axle and the chassis 10.

Each of the vehicle's axles or mounting arms is supported relative to the chassis by an inflatable member embodied as a bellows-type air spring 20. The air spring 20, described below, is inflatable between a deflated state where the axle is located closest to the chassis and the chassis is at its lowermost position relative to the ground (datum) and a fully inflated state wherein the chassis 10 is lifted relative to the axle and the ground. When deflated, suitable rubber stops (not shown) are provided so that the chassis comes to rest upon the mounting arm 16 or axle 14. Inflation of the air spring 20 causes it to lengthen and lift and support the chassis 10 relative to the axle 14.

Acting in conjunction with the air spring 20, the vehicle also includes a shock absorber 22 which may be of conventional design. The shock absorber 22 and air spring 20 are typically referred to as the vehicle suspension system.

Turning to FIG. 2, the arrangement of the air springs 20 for a vehicle according to the present invention is shown. The vehicle includes right front, left front, right rear, and left rear air springs 20a–d, each of the air springs supporting the chassis 10 above the corresponding axle. FIG. 2 also schematically illustrates a control system 24 for controlling the inflation and deflation of the individual air springs for raising and lowering of the chassis 10 for leveling of the vehicle. To provide a source of pressurized gas for inflating the air springs, a pressurized air source 26 is shown as communicating through the control system 24 to the individual air springs 20. Also an exhaust 50 is provided.

The bellows-type air springs 20, as illustrated in FIGS. 1 and 2, are generally known in the prior art. One manufacturer of the air springs is The Goodyear Tire and Rubber Co. of Akron, Ohio. A characteristic of such air springs, is that during inflation thereof they lengthen from a deflated state, as shown in FIG. 3A to an inflated state as shown in FIG. 3B. The lengthening of the spring urges the masses, for example, the chassis 10 and axle 14 to separate thereby raising the chassis 10 relative to the axle and to the ground or other datum. A characteristic specific to bellows-type air springs is that during inflation the cross sectional area acted upon by the pressure within the spring to lift the chassis decreases as the spring lengthens.

In the deflated state (FIG. 3A) the cross sectional area acted upon by the pressure in the spring is illustrated as A. When the spring is inflated, the cross-sectional area acted upon by the pressure within the spring to lift and support the chassis is represented by area A'. As shown, the cross sectional area reduces as the spring lengthens. The relationship between the cross-sectional area of the spring 20 and its length is well known. That is, if the length of the spring is known so then is the cross sectional area.

Further, from the relationship that $F = P \times A$ where F is the force necessary to separate the masses, i.e, lift the chassis, P is the pressure of the gas in the spring and A is the equivalent cross-sectional area (the area against which the pressure acts) once the length of the spring is known so is the force and vice versa. Table I, shown in FIG. 12, illustrates the relationship between the length or height of the spring and the force or load which it can support. This Table is for a Goodyear air spring part No. 23B-150. From this Table, it can be appreciated that for a given load, if pressure is known, then the height is also known and vice versa. Further, if the weight is known, the spring can be extended to its desired height to raise the chassis by simply introducing the correct corresponding pressure into the spring.

According to the present invention, then, it is advantageous to initially determine the weight of the chassis 10 imposed upon each individual air spring 20a–d. The determined weight not only provides the information necessary to level the vehicle as discussed below, but can also be of use in determining the weight of the cargo carried by the vehicle.

To determine the weight of the vehicle and to control the overall inflation and deflation of the air springs 20a–d, to level the chassis, the control system 24, as illustrated in FIG. 5, and compressed air source 26 are provided. The compressed air source includes an air pump 28. To power the pump 28, the 12-volt electrical system of the vehicle is supplied to the pump 28 via a dash mounted control panel 30 and a control relay 32. When powered, the pump 28 supplies compressed air at, preferably, a constant flow rate to a supply conduit 31, through a check valve 34 and relief valve 36, to a supply control valve 38 operated via a solenoid 38'. When the pump 28 is initially energized, the supply control valve 38 is closed. The check valve 34 aids in the start up of the pump 28 and the relief valve 36 is adapted to open and relieve compressed air through a vent 42 to maintain the proper pressure within the supply conduit 32. If desired, an accumulator could be added to the source 26. The source 26 and air control system may also include filters, dryers and the like to condition the air.

To supply the air compressed by the pump 28 to the air springs 20a–d, a supply header 44 extends from the supply control valve 38 around the vehicle to service all the air springs. Alternatively, individual lines could be routed to each air spring. The header 44 terminates at the panel 30 where the pressure of the gas within the header 44 is sensed to control the operation of the system as set forth below. To provide for venting of the air springs 20a–d, the header 44 communicates with a solenoid operated relief valve 48. For the solenoid valves described above, and hereinafter, the solenoid actuators will be designated with the valves reference numeral followed by a prime (').

To determine the weight and loading of the chassis, the control system initiates a calibration cycle described hereinafter with reference to a single air spring 20a. The same cycle is repeated for each of the air springs to determine the weight of the chassis at each air spring and thereby its distribution and overall weight.

To obtain proper leveling of the chassis, the calibration cycle should be run while the vehicle is stationary and resting on a relatively flat, horizontal surface.

During the calibration cycle the relay 32 is activated turning the pump 28 on by an appropriate switch at the panel 30 or alternately by the system control. When energized, the pump 28 supplies compressed air through the check valve 34 and relief valve 36 to the supply control valve 38. To calibrate the right front air spring 20a, the relief valve solenoid 48' is actuated to open the relief valve 48 and vent the header 44 through its suitable vent 50. Next, the control system opens solenoid operated valves 52 a–d disposed in conduits which provide communication between the springs and the header 44 such that the compressed air within the springs is vented through the supply header 44, relief valve 48 and vented through vent 50.

The solenoid operated valves 52a–d for each air spring may be of any suitable construction. FIG. 6 shows an exemplary construction of such a valve 52. The valve 52 includes a T-connection 54 which is connected into the header 44, the T-connection having a branch 56 which is connected to the valve 52. From the valve 52 a connection 58 is connected to the air spring to supply compressed air thereto or vent air therefrom.

The valve 52 includes an actuator 60 movable by the solenoid 52' between a closed position wherein communication between the branch 56 and stub 58 is blocked to an open position where communication between the header 44 and air spring through the branch and stub is provided. The solenoid 52' is adapted to hold the actuator 60 in a closed position when deenergized and, when the solenoid 52' is energized via a signal provided to one of the contacts 62 of a solenoid 52, to open the actuator and provide for the aforesaid communication. A second contact 64 for the solenoid 52' is grounded as is well known in the art.

Gradually, during the initial portion of the calibration cycle, the chassis is lowered as the springs deflate until it ultimately rests upon stops provided between the chassis and the axle or support arm. Thereafter, the solenoids 52a'-d' are deenergized closing the valves 52a–d and preventing communication between the air springs and the header 44 The relief valve 48 is also closed by deenergizing the solenoid 48' to prevent further venting of the header 44.

The pressure in the header 44 is monitored by a pressure sensor 65 (FIG. 8) which may be disposed at the panel 30.

The control system energizes the solenoid 52a' to open the actuator 60 of the valve so that the header 44 and pressure sensor 65 see the pressure of the air spring 20a. At this point, the solenoid 38' is energized to supply compressed air, at a substantially constant flow rate to the air spring 20a to begin inflating it. To provide the constant inflation rate the solenoid 52a' could be energized and deenergized in a pulsed fashion or a suitable orifice or orifices could be provided.

The pressure sensor (FIG. 8) disposed at the panel 30 senses the pressure of the header and thereby of the air spring 20a, in incremental time intervals such as once every five seconds or so. The sensed pressure is converted from an analog signal to a digital signal by a converter 67 as described below, the signal being provided to a microprocessor 68. The microprocessor 68 based upon the sensed pressure over a period of time, develops a pressure-time history 69 which may be assembled and stored by any suitable means. The assembled and stored pressure-time history of the inflation of the air spring 20a is graphically illustrated in FIG. 4. One method to develop such a history is for the processor to compare the sensed pressure with the pressure sensed at the previous time interval and determines a differential pressure $P_1$. If the calibration cycle has been operating for a sufficient length of time, the control system compares $\Delta P_1$ with the differential pressure, $\Delta P_2$ represented as the difference between the pressure sensed at the preceding time interval and the pressure sensed at the second preceding time interval. As the pressure-time history is developed for each new sensed pressure, the control system redetermines $\Delta P_1$ and $\Delta P_2$ and compares them. Further as each sensing and determination step proceeds, the previously determined $\Delta P_2$'s are processed to give an average $\Delta P_2$ represented as $\Delta P_2$ Ave. Each time a new $\Delta P$ is determined, it is compared with $\Delta P_2$ Ave.

As graphically illustrated in FIG. 4, at some particular time during the inflation of the air spring 20a the masses, i.e., chassis and axle or support arm will begin to separate whereupon the volume within the spring begins to increase. Because of this increased volume the determined $\Delta P_1$ will show a decrease with respect to the calculated $\Delta P_2$ Ave.

Graphically, this is illustrated by the history 69 of the graph on FIG. 4. When this event occurs, the control system recalls the pressure sensed at the preceding time interval represented by $P_s$ for processing to determine the weight of the vehicle on the spring.

Turning to FIG. 8, the pressure sensor 65 and microprocessor shown as 68 are schematically illustrated. The microprocessor 68 is controlled by a program ROM 70 which provides software to control the microprocessor in the manner described above and hereinafter. The control system may also include a second ROM 72 which has been previously encoded with data providing a concordance between pressure within the air spring, height (i.e., length of the air spring) and load. The data encoded on the second ROM 72 is specific to the characteristics of the air spring used on the vehicle. The concordance or lookup table between pressure, height and load encoded into the second ROM 72 is the data represented, for example, in Table I. Accordingly, at pressure $P_s$ as determined by the microprocessor, the processor would examine the data encoded in the second ROM 72 (i.e., the data from Table I) using the pressure $P_s$ and the height of the spring shown as 2.50 inches (i.e., when the chassis begins to be lifted) and examines the lookup table in the second ROM 72 to determine a corresponding load or weight. For example, given the pressure-time history of FIG. 4 and the pressure $P_s$ as being about 40 lbs./square inch, the processor via the lookup table in the second ROM 72 would retrieve from the table a load of about 2,000 lbs. This load would be displayed and could be encoded into a non-volatile EEPROM 74 so that in the event of a power failure the load as determined and during the calibration cycle would be retained. If desired, the load determined from the calibration cycle could be compared with a load previously encoded into EEPROM 74 to determine and, if desired, display the change in load.

After the load upon the air spring 20a has been determined through the calibration cycle, solenoid 52a' is deenergized (closed) and the calibration cycle is repeated anew for each of the air springs 20b-d.

After the loads have been calculated at each air spring, the control system is operated to supply compressed air to each spring 20a-d to raise it to any desired height, the processor comparing the load determined from the calibration cycle and desired height to the lookup table to find a concordance and retrieving the required pressure to raise the chassis to the desired height. This procedure is followed for each air spring 20a-d until the vehicle is leveled at the desired height.

As can be appreciated, the control system and air springs according to the present invention do not require position sensors in that, via the calibration cycle and from the known characteristics of the air springs, height can be determined by pressure. Further, the control system is well suited to calculate the overall weight of the chassis or weight changes as desired, and the weight at each air spring. Further, by encoding the characteristics of the vehicle such as the distances from longitudinal, latitudinal center axes of the vehicle to each air spring into the second ROM 72, the load calculated at each air spring can be used to determine the center of gravity of the vehicle.

Turning to FIGS. 7 and 9, the control panel 30 is shown. The control panel 30 is preferably disposed at the vehicle dash and includes an LED type display 76 which interfaces with the microprocessor 68 to give a visual, numerical readout of the weight at each air spring and, if desired, the gross weight of the vehicle. Alternatively, by using the EEPROM 74 the microprocessor may be adapted to provide an indicational weight change from a previous calibration cycle to the driver which may be useful particularly to determine the weight of cargo added or removed from the vehicle.

As discussed below, the control system may be adapted to receive input from position sensors at each or several of the air springs. The position sensors provide the reference points, i.e., spring height, which is necessary to determine the load on each spring.

Disposed on the display panel 30 are three push button type switches each having associated therewith an indicator light. One of the switches, identified as automatic switch 78 when depressed closes its contacts 78a and 78b (FIG. 8) signaling the microprocessor 68 that the automatic mode has been selected. Once the vehicle has been leveled, according to the above and the automatic mode is selected, the control system monitors the pressure on each spring maintaining a constant pressure therein and therefore the correct, load leveling height. Temperature changes and leaks, or the like, may cause pressure changes which must be compensated for by opening and closing the correct valves. When the automatic switch 78 is closed, the microprocessor 68 automatically controls the pressure in each spring and, to give an indication of the automatic mode, causes a green indicator light 80 to be lit.

To initiate the calibration cycle and to give the gross weight or weight change of the vehicle the control panel 30 includes a push button switch shown as weight switch 82, the pushing of which closes contacts 82a and 82b, signaling the microprocessor 68 to initiate the calibration cycle. Typically, when the vehicle parks on a flat surface and the weighing and load leveling is desired, the weight switch 82 is depressed initiating a calibration cycle described above.

The microprocessor during the calibration cycle causes a red light 84 to flash telling the operator that the cycle is ongoing. During the cycle, the weight change can be displayed as the data is received at the display 76.

When the vehicle is parked on an inclined surface or when manual control of each air spring is desired, the control panel includes a push button manual switch 86 which when pushed closes contacts 86a and 86b signaling the processor that the operator has taken over the manual control of the air springs. Closure of the manual switch 86 causes a yellow light 87 to be lit indicating that the operator now has complete control.

To manually control each individual air spring, the control panel 30 includes four 3-position, return-to-center type switches 88a-d each associated with a corresponding air spring 20a-d. The operation of the switches is schematically shown in FIG. 9 in conjunction with FIG. 5. In that the switches are similar in structure and operation, only switch 88a associated with the left front air spring 20a will be described in detail.

Should, for any reason, the operator desired to raise or lower the air spring 20a the manual switch 86 is depressed signaling the microprocessor that the manual mode has been selected. In any mode, the operator has complete control over each individual air spring to raise or lower the chassis 10 at that air spring. In the manual mode, the microprocessor is passive but stores the desired pressures of the air springs. The switch 88a has a lever 90 (FIG. 9) which is connected to the 12 volt electrical system of the vehicle such as the 12 volt battery. The lever 90 is actuated by movement of a suitable head 92 at the control panel 30. To raise the chassis 10 at the left front air spring, the head and lever is moved upwardly at the control panel causing the lever 90 to simultaneously engage and supply power to contacts 94 and 96.

The supply of power to the contact 94 is transmitted through an appropriate wire 98 to energize solenoid 52a' and provide communication between the header 44 and the air spring 20a. The supply of 12 volt power to the contact 96 triggers the pump relay 32 to supply power to the pump 28 and also energizes the solenoid 38' to provide the compressed air to the header 44 and to the air spring 20a to pump up the air spring (i.e., raise the chassis 10). Release of the head 92, by appropriate spring action in the switch 88a, returns the lever 90 to its intermediate position as shown in FIG. 9. wherein the solenoids are deenergized and the valves are closed.

When it is desired to lower the chassis 10 at the air spring 20a, the lever 90 is moved downwardly to make contact with contacts 100 and 102. The contact between lever 90 and the contact 100 supplies the 12 volt power to the solenoid 52a' to energize solenoid and open the valve 52a to provide communication between the header 44 and the left front air spring 20a. Simultaneously, the lever 90 supplies the 12 volt power to the contact 102 which energizes the solenoid 48' to exhaust air from the air spring 20a to the header 44 and relief valve 48. In this manner, the chassis 10 can be lowered at the left front air spring. To protect the various switches and solenoids, a fuse 104 may be provided.

As can be appreciated, each of the switches 88 a-d operate in the identical fashion to raise or lower each of the air springs 20 a-d as desired by the operator.

Turning to FIG. 8, the interface between the switches at the control panel 30 and the microprocessor 68 is schematically illustrated. As shown, the microprocessor powered by the 12 volt battery, receives inputs from the pressure sensor 65 and the various switches 78, 82, and 86 and from the first and second ROMS 70 and 72 and the EEPROM 74. In the automatic or weigh mode, the microprocessor examines the information received from the pressure sensor 65 and from time to time closes one or more switches in such a manner as to energize or deenergize the various solenoids and relay to supply compressed air to or vent air from each of the air springs 20a-d. Between each of the solenoids and relay are switches 108. Each of the switches 108 receives power from the 12 volt ignition system to, when actuated by the microprocessor 68, supply power to the various solenoids and relay. This power is protected by fuse 106. The manual override switches 88a-d are connected between the switches 108 and the various electrical components to provide the manual override capability. When the vehicle ignition switch is off, the 12 volt ignition is off and the microprocessor cannot control the system. This prevents draining of the battery if the vehicle is left unattended. The 12 volt ignition is also provided to the microprocessor causing it not to operate the system and assume a standby mode.

Figure 11:
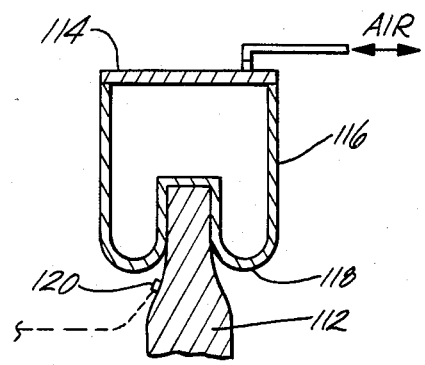
FIG. 11 illustrates a rolling lobe type air spring of the type used for the vehicle schematically illustrated in FIG. 10.

Turning to FIGS. 10 and 11, and alternative embodiment of a vehicle leveling system and method is shown. For the vehicle as shown in FIG. 10 the left front and right front wheels 12, and more particularly the axles 14 or mounting arms, are spaced from the chassis 10 by the bellows-type air springs 20a and 20b as described above. At the rear of the vehicle, the wheels 12 and axle 14 are spaced from the vehicle by rolling lobe-type air springs 110. The rolling lobe-type air springs 110 may be preferred over the bellows-type air spring at the rear of the vehicle in that the rolling lobe-type air springs have preferred spring rate characteristics over the bellows springs. The vehicle also includes shock absorbers 22, control system 24 and a source of compressed air 26.

A rolling lobe-type air spring is schematically shown in FIG. 11. The rolling lobe spring includes a pedestal 112 which is typically connected to the vehicle axle. Connected to the chassis the rolling lobe includes a cap 114 which is attached to the pedestal 112 by an inflatable portion 116. When deflated, the chassis is lowered to rest upon the vehicle axle.

The inflatable portion 116 includes a torroidal lobe 118 which, as the portion 116 is deflated rolls downwardly around a portion of the pedestal 112. When the inflatable portion 116 is inflated with compressed air, the cap 114 moves upwardly unrolling the lobe 118 from the pedestal 112. In that the area acted upon by the pressure within the inflatable portion 116 is constant and is represented by the cap 114, no such relationship exists between height or length of the spring and cross-sectional area as did with the bellowstype springs 20 described above.

The characteristics of a rolling-lobe spring 110 are illustrated by the data depicted in Table II, shown in FIG. 13. As can be appreciated for any particular load and pressure the spring can have various heights.

If a rolling-lobe type spring is desired, particularly at the rear wheels, means must be provided to give an indication to the control system 24 of the height of the chassis relative to the axle. For this purpose, each rolling-lobe spring 110a and 110b has associated therewith means for sensing the position of the chassis relative to the axle. While any suitable means may be used the means as depicted in FIG. 11 shows a position sensor 120 located on the pedestal 112, the position sensor 120 being activated when the lobe 118 rolls thereover. The position sensor 120 when closed by the lobe 118 sends a signal to the control system 24 giving an indication of the height of the chassis relative to the axle.

The vehicle according to FIG. 10 operates in the following fashion. The bellows-springs 20a and 20b at the front wheels are inflated with a pressure which spaces the chassis 10 the desired distance from the axle 14. Similarly, the rolling lobe springs 110 are likewise inflated to the desired position which may be determined at a point when the lobe 118 disengages a position sensor 120. The initial inflation may be controlled by appropriate parameters encoded into the first or second microprocessor control ROMS. In this mode the vehicle, usually unloaded, is ready to operate. As the vehicle travels down the road, road bumps and turning of curves cause the lobe 118 to occasionally close the position sensor 120.

If the vehicle and more particularly the rear of the vehicle is at the proper height during the ride of the vehicle down the road, the position sensor 120 should be activated about half of the time as bumps are encountered, the bumps urging the pedestal 112 upwardly causing lobe 118 to activate the position sensor 120. If the position sensor is activated all of the time, or most of the time, this fact gives an indication to the control system that the chassis is too low and must be raised. Conversely, if the switch is not activated at all, or very rarely, this indicates to the control system that the spring is too high and must be lowered.

To control the height, the switch activations are collected over a period of time, the number of activations being counted to establish a duty cycle for the position switch. If over a period of time the position sensor 120 is activated, approximately fifty per cent of the time the control system 24 would maintain the control valves to the springs closed. If the duty cycle indicates that the switch is closed approximately seventy-five percent of the time, the control system would be activated to pump air slowly to the rolling-lobe springs until the switch is activated approximately forty to sixty percent of the time. When such a duty cycle is obtained the control valves to that spring remains closed. Should the duty cycle indicate that the position sensor 120 is activated one-hundred percent of the time, giving and indication that the chassis is still low, the control system 24 would provide compressed air quickly from the source 26 to the rolling-lobe springs 110a and 110b until such time as the duty cycle is above twenty-five percent. Conversely, if the duty cycle is zero percent, that is, the position sensor 120 is very rarely activated, air is let out from the rolling-lobe springs rapidly until the duty cycle is at least greater than twenty-five percent. Should the duty cycle show that the switch is activated only twenty-five percent of the time then air is slowly let out from the air springs until the duty cycle is between forty to sixty percent. The foregoing provides the desired ride characteristics and height of the chassis.

When the vehicle is loaded, according to the characteristics of most vehicles, the load is mainly over the rear wheels and upon the rolling-lobe springs 110. Since the pressure within the rolling-lobe springs 110a and 110b is still indicative of the weight or weight change of the vehicle, this weight change can be compared to suitable data encoded into the second ROM 72, the data providing a concordance (i.e., a Table) between the change in pressure and the desired new pressure to be applied to the bellows-springs 20a and 20b. Once this data is retrieved (looked-up) from the second ROM 72, the bellows-springs are provided with compressed air at the pressure determined from the table lookup.

As stated above, the system according to FIG. 10 can also be used simply to determine the weight, and more particularly, the weight change of the vehicle. This feature is important for trucks where it is advantageous to calculate the weight of the load put on or taken off of the truck. Accordingly, the rolling-lobe springs 110a and 110b are pressurized, with the vehicle unloaded and parked on level ground, until the vehicle is leveled. The position sensors 120 provide for such leveling in that they each send a signal to the control system when the lobe, and therefore the chassis, is at a certain height. This height may be factory selected. Further, the front bellows-springs 20a and 20b are pressurized to the correct pressure corresponding to the level vehicle height. In this state, i.e, the level state, the vehicle is leveled with respect to a datum represented by the ground. The pressure of the gas in the rolling-lobe springs at the level state is, via the data encoded (the data corresponding to Table II) in the second ROM 72 and from the known height, compared to the data to determine the weight on each of the rolling-lobe springs 110a and 110b. Through the known characteristics of the vehicle which may be represented by an algorithm or the like, the total vehicle unloaded weight $W_u$ may be determined. For example, the vehicle characteristics may be such that for a given load, seventy percent of the load is imposed on the rolling-lobe springs whereas the remaining thirty percent of the load is borne by the front bellows-springs. This relationship can be conveniently encoded into a ROM for the control system. Accordingly, the weight on the rolling-lobe springs is divided by 0.70 since seventy percent of the total weight is on the rear springs. This unloaded weight $W_u$ is stored and if desired displayed. Alternatively, only the weight on each of the rear springs is stored. As a further alternative, the unloaded weight of the vehicle may be simply stored in the control system.

The vehicle can then be operated as desired.

When the vehicle is loaded, as stated above, a large portion of the weight is typically distributed over the rear wheels, i.e., on the rolling-lobe springs 110a and 110b. With the known characteristics of the vehicle it can be determined, approximately, what portin of the weight or load is imposed upon the rolling-lobe springs 110a and 110b, the remainder of the load being imposed on the bellows-springs 20a and 20b.

Upon loading of the vehicle, the chassis will move downwardly and the supporting springs will be compressed. To determine the weight, the vehicle is again parked on level ground. Initiating the leveling cycle causes compressed air to be supplied to the rolling-lobe springs 110a and 110b until the position sensors 120 indicate that the desired, level height has been attained. The control system at the level height ceases inflation of the rolling-lobe springs and senses the pressure via pressure sensor 65. This new sensed pressure is compared to the encoded data of the second ROM 72 (i.e. Table II) and a new weight on the rear springs is calculated. This new weight is processed by the control system, i.e. by applying the vehicle characteristic algorithm, to determine the loaded weight $W_l$ of the vehicle. If desired, this weight can be displayed. Further, by recalling $W_u$ and subtracting it from $W_l$, the weight of the load can be determined. Alternatively, the stored unloaded weight on each spring is compared to the loaded weight to determine the weight of the load on the springs.

From the weight distribution algorithm the total weight of the load can be determined.

Once the load weight or weight change is known, the control system supplies pressurized gas to the bellows air springs to properly level the loaded vehicle.

While we have shown and described certain embodiments of the present invention, it is to be understood that it is subject to many modifications without departing from the spirits of the invention. For example, position sensors could be disposed with the bellows-type air springs if for a given vehicle the load is not generally concentrated over the rear wheels.

What is claimed is:

1. A method for determining the force necessary to separate a first and a second mass having disposed therebetween an inflatable member comprising:
    inflating the member from a deflated state with a compressed gas at a constant flow rate;
    sensing the pressure of the gas within the member at substantially equal time intervals;
    comparing the pressure sensed at one time interval with the pressure sensed at the preceding time interval to determine the pressure change over said time interval; repeating the step of comparing for the next succeeding time intervals.
    comparing the pressure change to at least one prior pressure change;
    generating a signal indicative of the pressure in the member when the pressure change decreases compared to the prior pressure change; and
    processing the pressure signal with the known characteristics of the inflatable member to determine the force necessary to separate the masses.

2. A method for determining the force necessary to separate a first and a second mass having disposed therebetween an inflatable member comprising:
    supplying compressed gas to the member in pulses, said pulses occurring at a constant rate for a predetermined duration;
    sensing the pressure of the gas within the member at time intervals;
    comparing the pressure sensed at one time interval with the pressure sensed at least one preceding time interval to determine the pressure change;
    repeating the step of comparing;
    comparing the pressure change to at least one prior pressure change;
    generating a pressure signal when the pressure change decreases compared to at least one prior pressure change; and
    processing the pressure signal with the known characteristics of the inflatable member to determine the force necessary to separate the masses.

3. A system for determining the force necessary to separate a first and a second mass, the system comprising:
    an inflatable member disposed in a deflated state between the masses;
    a source of compressed gas;
    means for supplying the compressed gas to the member at a constant rate for inflation thereof for separating the masses;
    means for sensing the pressure of the gas within the member at substantially uniform time intervals during inflation thereof;
    means for comparing the sensed pressure with the pressure sensed at a preceding time interval to determine the pressure change per unit time and comparing the pressure change per unit time with previously determined pressure changes per unit time;
    generating a signal corresponding to pressure when the pressure change per unit time decreases in comparison to previously determined pressure changes indicating separation of the masses; and
    processing the pressure signal to determine the force corresponding to the pressure signal.

4. A control system for an inflatable spring member disposed between sprung and unsprung masses, the member inflatable from a deflated state to an inflated state to separate the sprung and unsprung masses, the system comprising:
    means for inflating the member with a compressed gas at a constant flow rate;
    means for sensing the pressure of the gas within the member at time intervals;
    means for comparing the pressure sensed at each time interval with the pressure sensed at least one preceding time interval to determine a pressure-time history, the history being of a first characteristic when the member is being inflated and is at a deflated state and changing to a second characteristic when the masses begin to separate, the comparing means issuing a pressure signal when the history changes from the first to the second characteristic; and
    means for processing the pressure signal to determine the force corresponding to the pressure signal issued when the masses separate.

5. The system of claim 4 wherein the inflating means include an orifice to provide gas at a constant flow rate.

6. The system of claim 4 wherein the inflating means include a control system for an inflatable spring member disposed between sprung and unsprung masses, the member inflatable from a deflated state to an inflated state to separate the sprung and unsprung masses, the system comprising:
    means for inflating the member with a conpressed gas at a constant flow rate including a valve which is pulsated between an open and a closed position to admit gas at a constant rate to the member;
    means for sensing the pressure of the gas within the member at time intervals;
    means for comparing the pressure sensed at each time interval with the pressure sensed at at least one preceding time interval to determine a pressure-time history, the history being of a first characteristic when a member is being inflated and is at a deflated state and is changing to a second characteristic when the masses begin to separate, the comparing means issuing a pressure signal when the history changes from the first to the second characteristic; and
    means for processing the pressure signal to determine the force corresponding to the pressure signal issued when the mass is separate.

7. The system of claim 4 wherein the processing means include a data processing device encoded with data representing the correlation between pressure signal and force, the device matching the pressure signal to the encoded data and recalling the corresponding force.

8. A method for leveling a load relative to a datum comprising:
    supporting the load relative to the datum on at least one inflatable member of the type where, for a known load, pressure of a gas within the member corresponds to a height of the load relative to the datum, the member inflatable from a first non-loading supporting state corresponding to a known calibrated load height to an inflated state to elevate the load to a desired level height;

inflating the member at the first state with compressed gas at a constant flow rate;

sensing the pressure within the member at substantially uniform time intervals;

comparing the sensed pressure with the pressure sensed at at least one preceding time interval to develop a pressure increase per unit time history, the history being a first characteristic when the member is inflated before the load is supported and a second characteristic when the the load is supported;

determining the pressure at which the history changes from the first to the second characteristic;

establishing the load borne by the air spring from the determined pressure; and based upon the established load, pressurizing the inflatable member to the pressure corresponding to elevating the load at the desired, leveling height.

9. A system for leveling a load relative to a datum comprising:

at least one inflatable member to support the load, each member inflatable from a deflated state where the member has a determined length to an inflated state of a length necessary to level the load relative to the datum, each member further being of the type where, for a known load, pressure correlates to member and load height;

a source of compressed gas;

means for supplying compressed gas to each member at a constant rate;

means for sensing the pressure of the gas within the member;

means for developing from the sensed pressure a pressure per unit time history of the pressure within the member as it is inflated from the deflated state to a second state where the load is first lifted relative to the datum, the history being a first characteristic when the member is at the deflated state and a second characteristic when the load is lifted;

means for determining from the history the pressure at which the history changes from the first to the second characteristic representing the pressure at which the load is lifted by the member;

means for generating a pressure signal representative of the pressure at which the history changes from the first to the second characteristic and from the known deflated height of the member;

establishing the load borne by the member; and inflating the member to a pressure which correlates to a member and load height such that the load is level relative to the datum.

10. A method for determining the weight of a loaded vehicle having an unloaded weight and having at least two axles with a rolling-lobe type air spring support the vehicle chassis at less than all points of support between said axles and chassis, the vehicle having a known weight distribution characteristic, the method comprising:

inflating each air spring until the vehicle is at a predetermined height;

sensing the pressure of the gas within each air spring;

determining the weight on each air spring from the sensed pressure and the known pressure weight relationship for the spring; and from the known weight distribution characteristic and from the weight on each spring, determining the weight of the load.

* * * * *